Patented Nov. 23, 1943

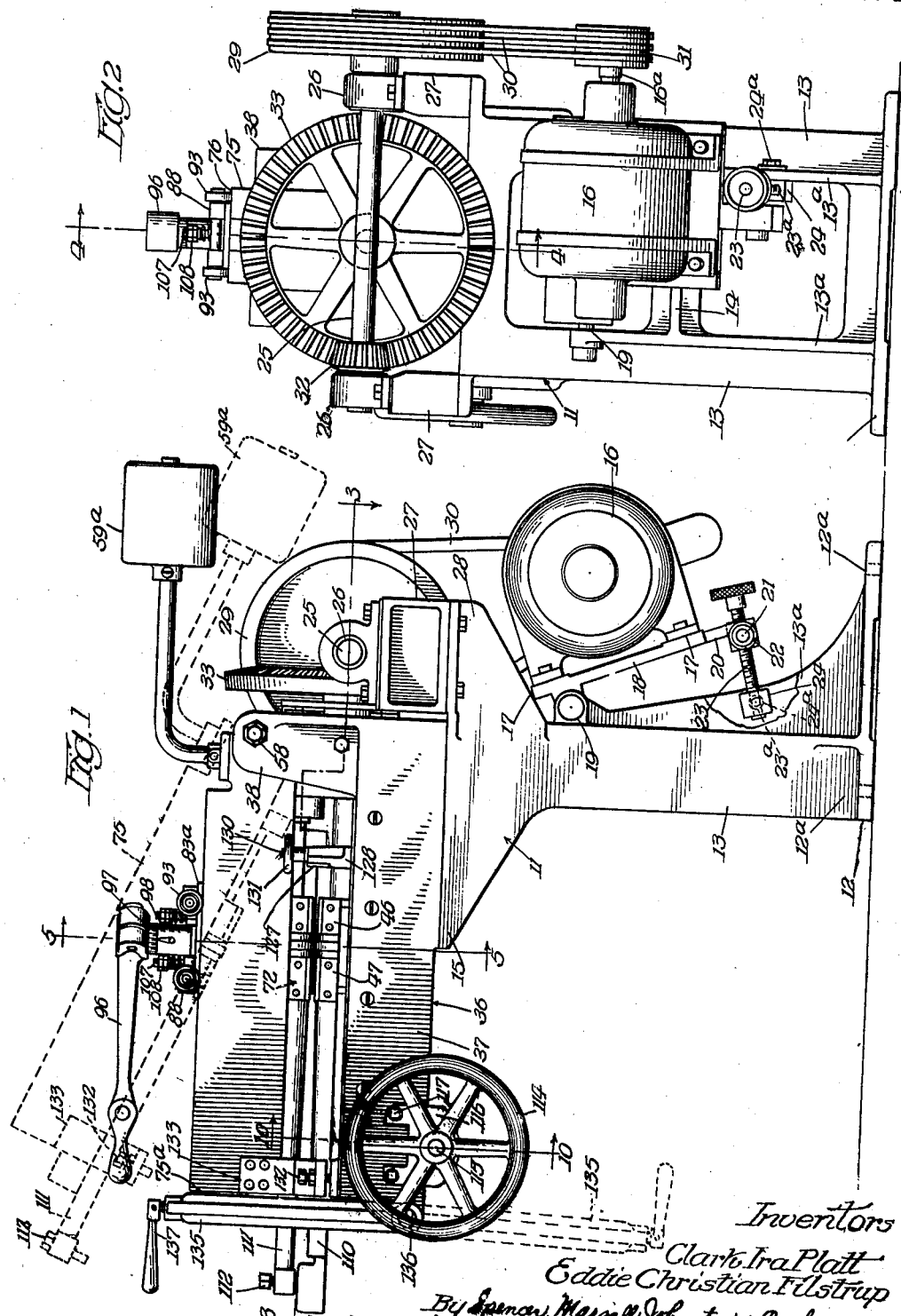

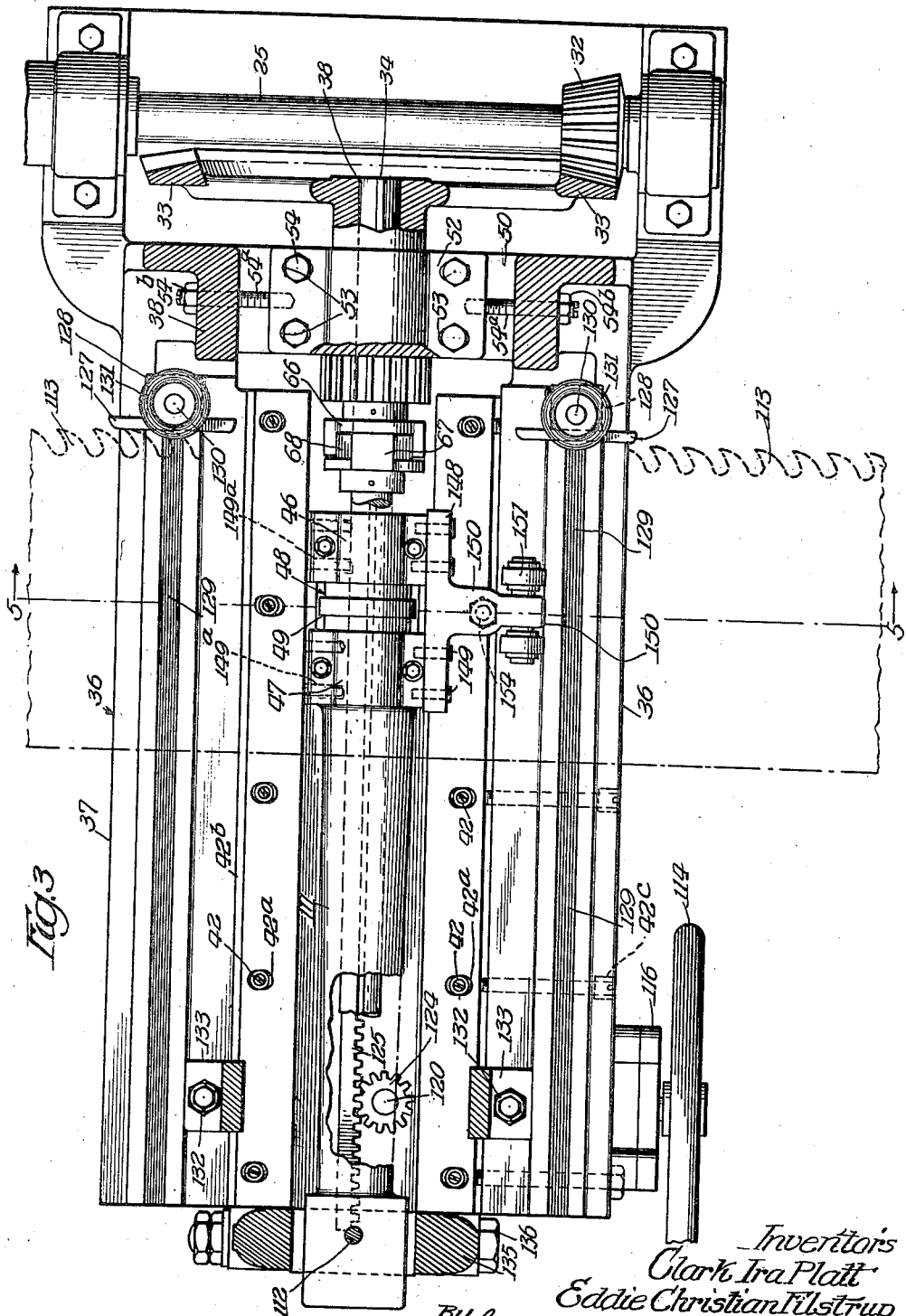

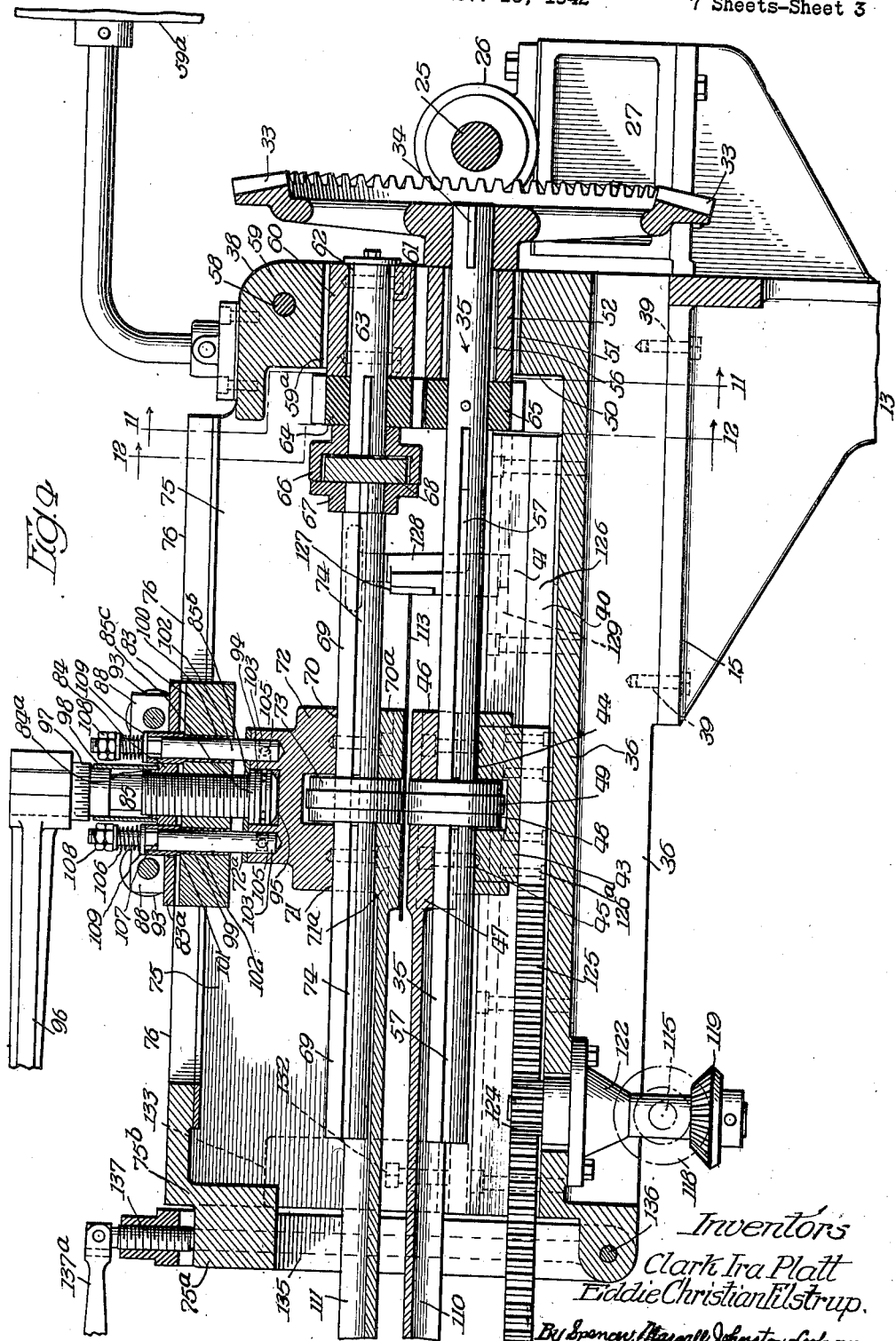

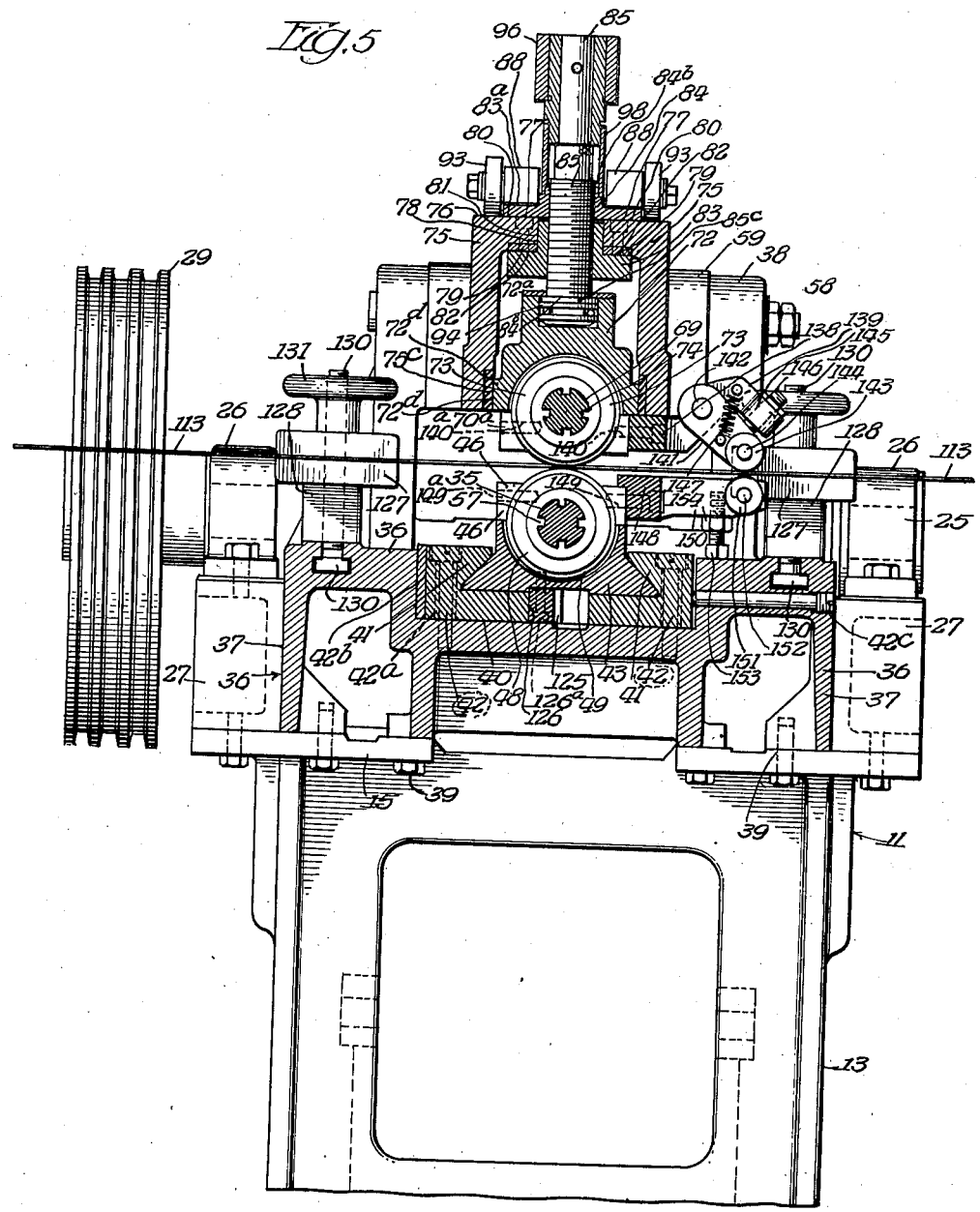

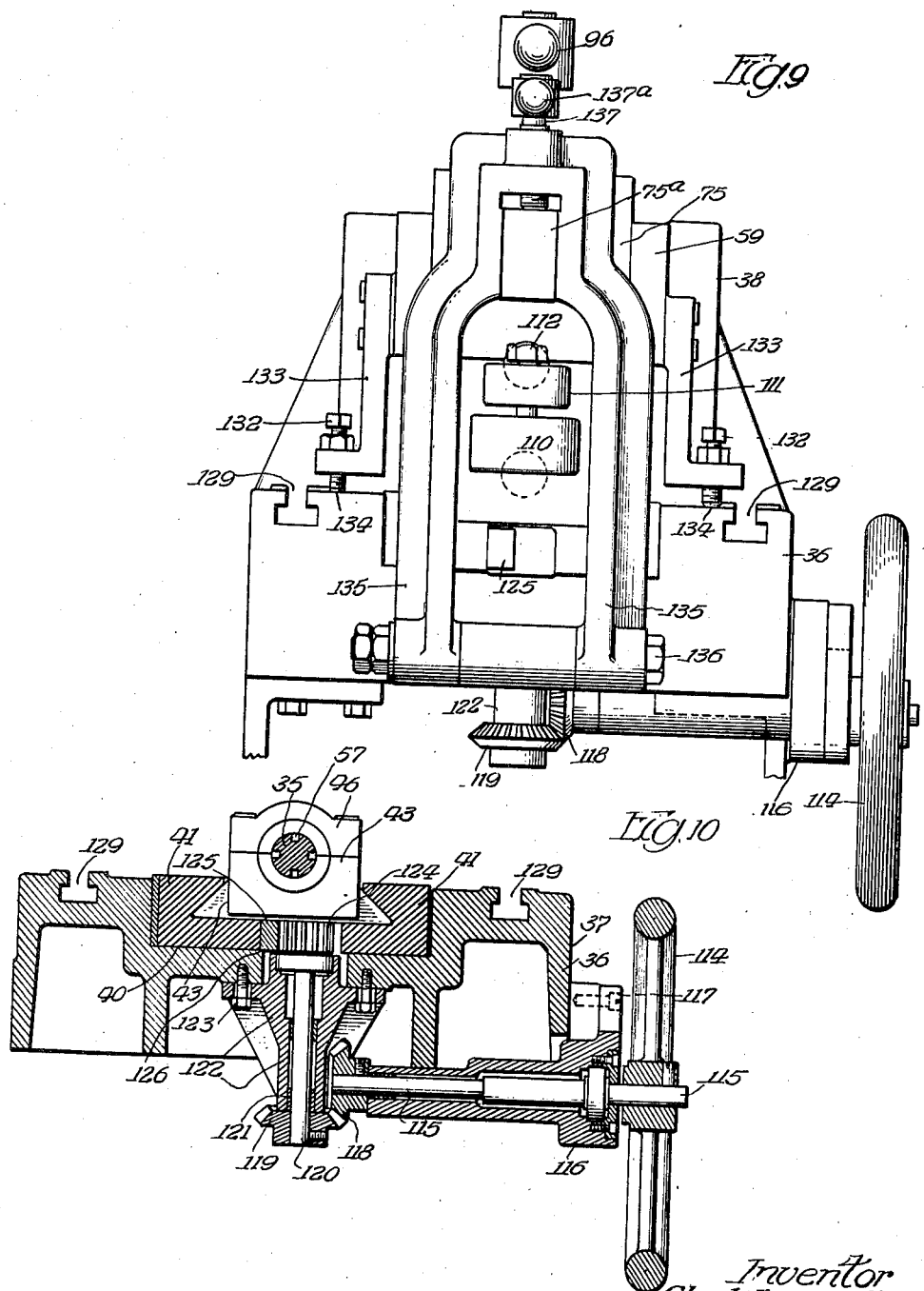

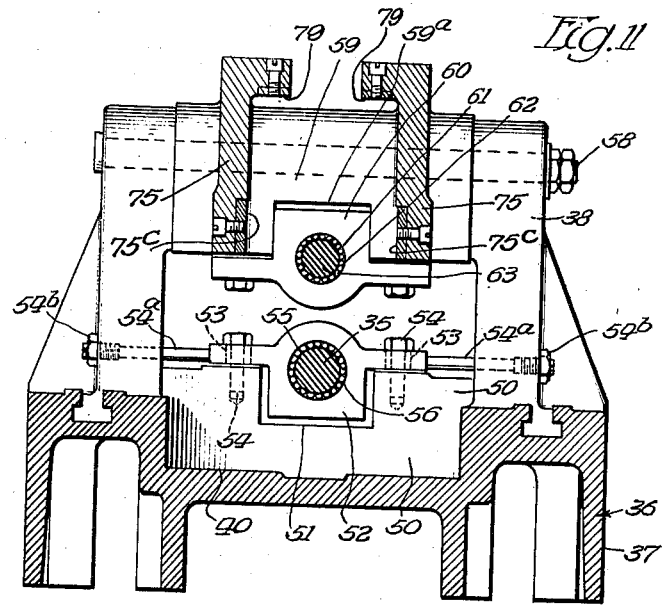
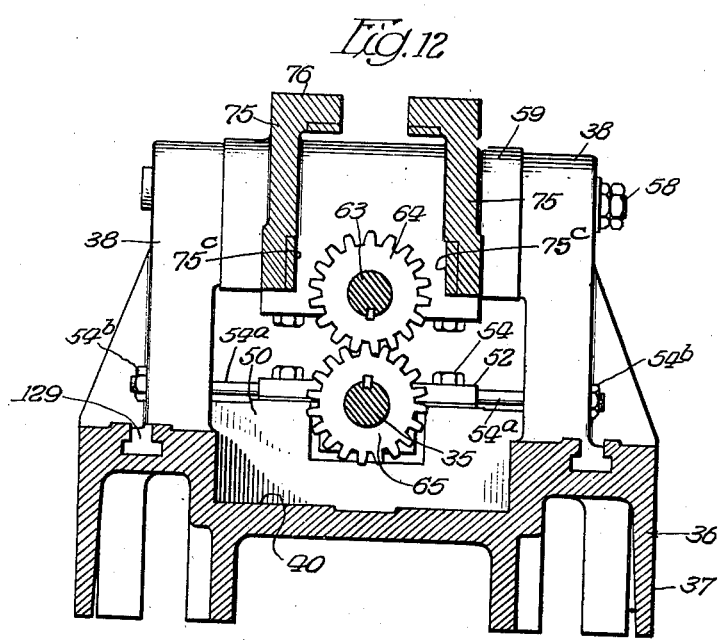
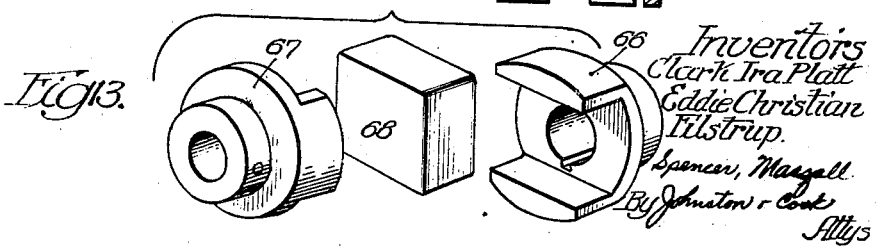

2,334,837

UNITED STATES PATENT OFFICE 2,334,837

BAND SAW STRETCHER

Clark Ira Platt, Coloma, and Eddie Christian Filstrup, St. Joseph, Mich., assignors to Covel Manufacturing Company, Benton Harbor, Mich., a corporation of Michigan Application November 16, 1942, Serial No. 465,804

2 Claims. (Cl. 76—27)

This invention relates to a machine for straightening and stretching band saws and other articles, especially those of large dimensions.

A primary object of the present invention is to provide an improved machine which is readily adjustable, accurate, simple and efficient for straightening, stretching and restoring to form various sizes of band saws or other objects which have become kinked, buckled, or otherwise deformed.

Another object of the invention is the provision of novel means for adjusting the parts of the machine readily and accurately to accommodate the machine to articles of different sizes and thickness.

A further object is the provision of an improved support for one of the straightening and stretching rolls, and providing for both axial and radial adjustment of the roll without tilting or canting the roll.

A further object is the provision of an improved support for one of the straightening and stretching rolls and providing for both axial and radial adjustment of the roll without tilting or canting the roll, said support and the roll being swingable to an inoperative position providing for free and easy insertion of a band saw or like continuous article.

A still further object is the provision of auxiliary straightening rollers arranged for taking bad twists and the like out of articles such as band saws, the auxiliary rollers being detachably mounted in a new and novel manner and being readily attached to the machine at either side of the main rolls.

Still another object is the provision of improved means for slidably supporting one of the main rolls on a bed plate of the machine.

Numerous other objects and advantages will be apparent throughout the progress of the following specification.

The accompanying drawings illustrate a selected embodiment of the invention and the views therein are as follows:

Fig. 1 is a side elevation of the machine;

Fig. 2 is an end elevation from the right end of the machine shown in Fig. 1;

Fig. 3 is a plan section on the line 3—3 of Fig. 1;

Fig. 4 is a central vertical section on the line 4—4 of Fig. 2;

Fig. 5 is a cross-section on the line 5—5 of Fig. 1;

Fig. 9 is a partial end elevation of the left end of the machine shown in Fig. 1;

Fig. 10 is a cross-section on the line 10—10 of Fig. 1;

Fig. 11 is a cross-section on the line 11—11 of Fig. 4;

Fig. 12 is a cross-section on the line 12—12 of Fig. 4; and

Fig. 13 is a perspective view of disassembled parts of universal connection shown in Fig. 4.

Figure 6:
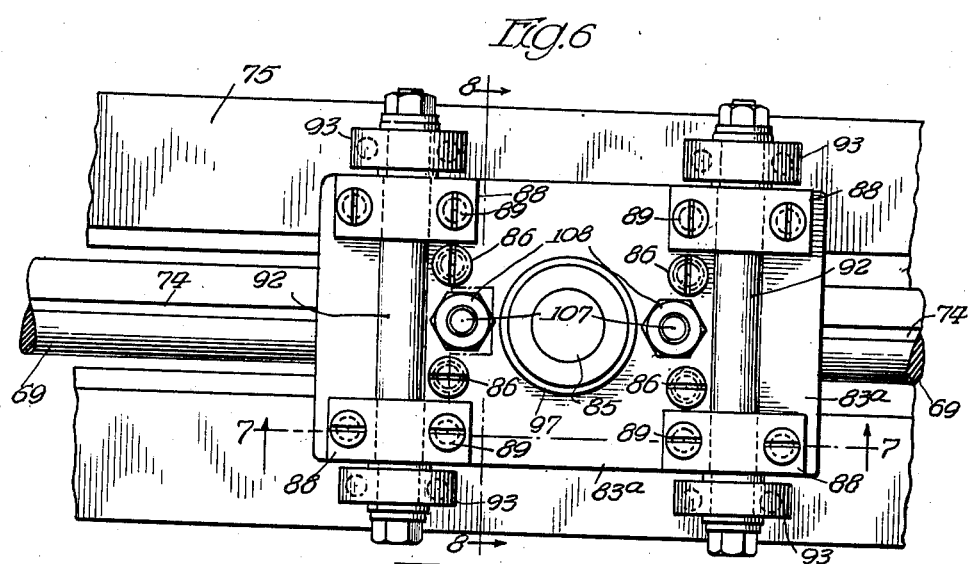
Fig. 6 is a plan view of adjusting means provided in the machine.

The particular arrangement shown in the drawings, for the purpose of illustrating the invention, may be described as follows:

Supporting frame 11 is provided with base 12 adapted to be secured to a floor or other means of support at 12a, legs 13 with laterally extending flange portions 13a connected by integral cross bar 14, and horizontally extending portions 15. Motor 16 having drive shaft 16a is secured at 17 to base 18, one side of which is pivotally supported at 19 in the upper portion of flanges 13a; the opposite side of base 18 being adjustably supported by integral bracket 20, which is pivotally mounted at 21 on block 22 threaded upon screw 23, whose lower end 23a engages block 24 pivoted at 24a to one of legs 13.

Countershaft 25, having its axis parallel to the axis of motor drive shaft 16a, is journaled in bearings 26 mounted on brackets 27 which are supported on integral arms 28 of frame 11. Grooved pulley 29 is mounted on one end of shaft 25, and adapted to rotate therewith. Pulley 29 is connected by means of V belts 30 with grooved pulley 31 which is mounted on shaft 16a so as to rotate therewith. Bevel pinion 32 is fixedly mounted on shaft 25 near its other end and adjacent the inner end of bearing 26 and is adapted to engage bevel gear 33 splined at 34 to one end of shaft 35, which has its axis in the same horizontal plane as, but is disposed at right angles to, the axis of shaft 25.

Bed 36 having longitudinally extending sides 37, and opposed upwardly extending integral arms 38, at one end thereof, is secured to upper portions 15 of frame 11 at 39. Bed 36 is provided with a central, longitudinally extending trough or guideway 40 adapted to receive spaced gibs 41, which are adjustably secured to the bed by bolts 42 extending through elongated holes 42a and held in adjusted position by shim plate 42b and set screws 42c. The gibs are thus adjustable to take up wear and may be readily removed for replacement by new gibs.

Bearing block 43 is dovetailed and slidably mounted in gibs 41 and is provided with horizontally spaced bearings 44 and 45 adapted to receive shaft 35. Bearings 44 and 45 have removable caps 46 and 47, respectively. Block 43 is provided with a central, vertical recess arranged to receive roller 48 which is slidably mounted on, and adapted to rotate with, shaft 35. Roller 48 is preferably made of hardened steel and has an enlarged peripheral portion 49.

Cross support 50, integral with bed 36 at one end thereof, has a central recess 51 extending longitudinally of the machine and adapted to receive bearing block 52 in adjustable spaced relation. Block 52 is provided with slots 53 and is adjustably secured to support 50 by screws 54 adjustably mounted in slots 53, which are arranged to permit transverse adjustment of the position of block 52 by adjustment of screws 54a mounted in arms 38 and having their ends in engagement with the sides of block 52. To maintain them in selected positions of adjustment, screws 54a are provided with lock nuts 54b. Bearing 55 is mounted in block 52 adjacent gear 33 and is adapted to receive shaft 35. Bearing 55 may be provided with anti-friction rollers 56.

Shaft 35, which is journaled in bearing 55, is provided with a plurality of spaced keyways 57 extending the greater part of its length, and the trough 40 is of sufficient length to permit the sliding of block 43 along shaft 35 a distance extending from its end opposite that on which gear 33 is mounted, adequate to accommodate the work for which the machine is designed. Block 59 is pivotally mounted on rod 58 supported in arms 38, and spaced upwardly from block 52. Bearing block 60 is mounted in recess 59a provided in block 59. Bearing 61, which is mounted in block 60, may be provided with anti-friction rollers 62. Stub shaft 63, journaled in bearing 61 and having its axis normally parallel to the axis of shaft 35, has splined to it pinion 64, which is adapted to mesh with gear 65 fixedly mounted on shaft 35.

Universal connecting member 66 is fixedly mounted on shaft 63 at its inner end and connected with universal connecting member 67 through connecting block 68. Member 67 is fixedly mounted on one end of shaft 69 which is rotatably mounted in bearings 70 and 71 supported in block 72. The coupling 66—67—68 permits vertical adjustment of the shaft 69 while maintaining its axis parallel with the shaft 35. Block 72 and bearings 70 and 71 are substantially inverted counterparts, respectively, of block 43 and bearings 44 and 45, except that block 72 is suspended in a manner presently to be described, instead of being secured to gibs. As in the case of bearings 44 and 45, bearings 70 and 71 have removable caps 70a and 71a, respectively. Block 72 is adapted to receive roller 73 which is substantially identical with roller 48, with which it is arranged to cooperate. Roller 73 is splined to shaft 69 and slidable along keyways 74 provided therein.

The block 72, shaft 69 and roller 73 are carried by an upper supplemental support and are vertically adjustable to accommodate various sizes and shapes of work material and different deformations therein between the rolls 48 and 73. In accordance with the present invention the vertical adjustment is such as to move the shaft 69 perpendicularly with respect to the axis of the shaft 35 thereby to maintain the shafts parallel and avoid tilting or canting of the roller 73. The support for the block 72 is also slidably mounted on the supplemental support to provide for adjustment of the roller 73 axially of the shaft 69.

The supplemental support comprises spaced supporting members 75 formed integral with block 59 and extending laterally therefrom longitudinally of the machine. The members 75 are provided on their upper edges with inwardly extending, angular flange portions 76 each having finished guide surfaces 77, 78 and a removable insert 79 adapted slidably to receive cooperating surfaces of an upper slide plate 83a and a lower slide block 83; surface 80 of plate 83a engaging the surfaces 77, and surfaces 81 and 82 of block 83 engaging surfaces 78 and 79, respectively. Block 83 is yieldably secured to plate 83a by screws 86 provided with springs 87 interposed between their heads and the upper surface of plate 83a, the springs 87 acting normally to draw plate 83a and block 83 against the surfaces 77 and 79 respectively.

Bearing blocks 88 are mounted on plate 83a at each corner thereof and are yieldably secured to the plate by screws 89 having springs 90 interposed between the screw head and shouldered recesses 91 provided in the blocks 88 and acting normally to draw the blocks 88 against the upper surface of plate 83a. The blocks 88 carry a pair of transversely extending shafts 92 having anti-friction rollers 93 rotatably mounted thereon at opposite sides of the plate 83a. The rollers 93 are arranged to travel on the upper surface of flange 76 adjacent the guide surface 77 and are adapted to take a portion of the load on the plate 83a to assist in sliding the plate along the supplemental support to adjust the position of roller 73 axially of shaft 69. By turning screws 89 the springs 90 can be adjusted to divide the load on plate 83a as desired between the rollers 93 and the guide surfaces 77, it being desirable always to maintain the plate 83a in contact with the surfaces 77.

The block 72, shaft 69 and roller 73 are adjustably supported from the plate 83a and block 83 by means of a vertical supporting shaft 85 having a threaded portion 85a which is threadedly received in block 83. The shaft 85 extends upwardly through the plate 83a and is rotatably and slidably received within an upwardly extending flange 84 on the plate. The lower end of shaft 85 is rotatably but non-slidably attached to the block 72 by a thrust bearing 94 received within a socket 95 provided in block 72. A handle 96 is secured to the upper end of shaft 85 adjacent a collar 97 having a measuring scale marked thereon and provides for rotating shaft 85 to effect vertical adjustment thereof. The thrust bearing 94 is retained in the socket 95 by a plate 72a secured to the top of block 72 by means of screws 72b and provided with a central opening 72c through which shaft 85 extends. Plate 72a engages the upper surface 85b of a washer 85c provided between the plate and thrust bearing 94.

Figure 7:
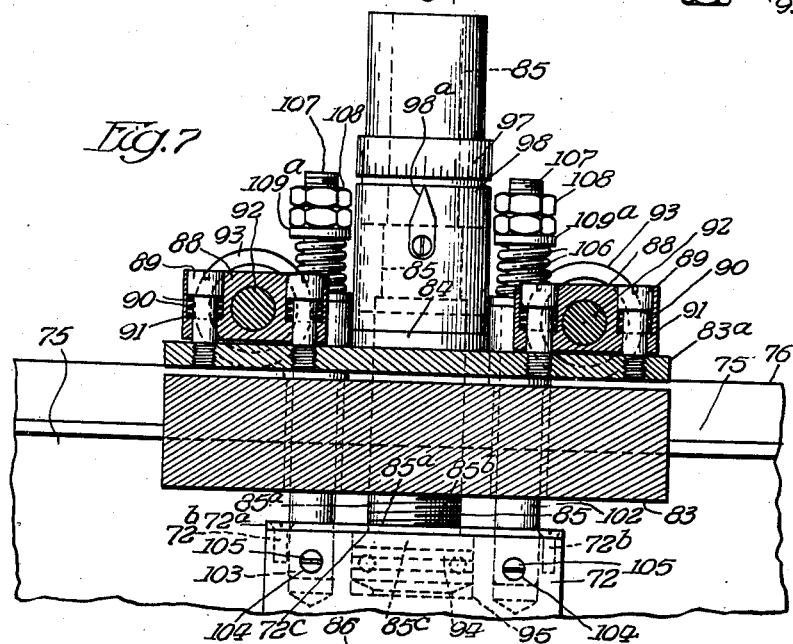
Fig. 7 is a cross-section on the line 7—7 of Fig. 6.
Figure 8:
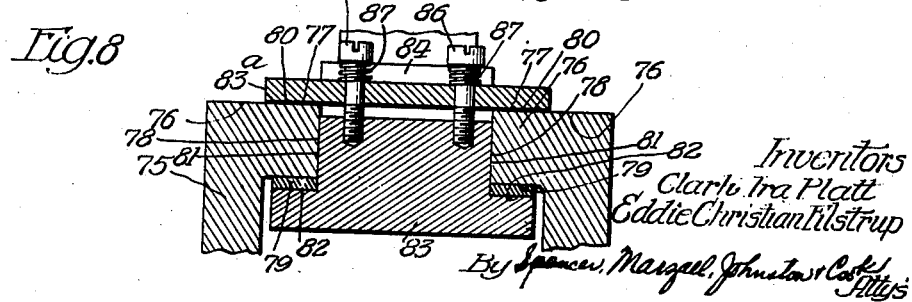
Fig. 8 is a cross-section on the line 8—8 of Fig. 6.

Flange 84 on plate 83a has a reduced portion 84a adapted to receive one end of a sleeve 98 surrounding the shaft 85 between the flange and collar 97. Sleeve 98 carries an index 98a, Fig. 7, on its upper edge arranged to register with the measuring scale on collar 97, thereby to indicate the adjustment of roller 73.

The axes of the shaft 69 and roller 73 are maintained parallel with the axes of shaft 35 and roller 48 in all positions of vertical adjustment by means of a pair of guide pins 102 which extend parallel with the supporting shaft 85 on opposite sides thereof. The pins 102 extend upwardly through vertical openings 99 provided in the block 83 and slidably received within sleeves 100 having external shoulders 101 engaging the upper surface of block 83. The lower ends 103 of the guide pins are mounted in holes 104 provided in block 72 and are secured to the block 72 by means of locking pins 105. The sleeves 100 pass through suitable openings provided in upper slide plate 83a and extend upwardly above the top of the slide plate. Springs 106 are mounted on upper reduced portions 107 of the pins 102 and are compressed between the sleeves 100 and nuts 108 threaded on the outer ends of the pins, washers 109 and 109a being interposed between the springs and the sleeves 100 and nuts 108 respectively. The springs 106 exert an upward pull on block 72 and provide for taking up backlash or play in the adjusting mechanism. The arrangement of the parts is thus such that the block 72, shaft 69 and roller 73 can be vertically adjusted with a high degree of precision and without tilting or canting of the roller 73.

The supporting members 75 of the upper supplemental support also cooperate with the block 72 to assist in maintaining the axes of the shafts 69 and 35 parallel and rigidly to support the roller 73 in any vertical or axial adjusted position. As best shown in Fig. 5, the block 72 is provided with laterally extending portions 72d adapted to have sliding fit with inserts 75c, Figs. 5, 11 and 12, detachably mounted on the lower inside portions of the supporting members 75. The block 72 is thus rigidly although adjustably mounted in the supplemental support, and the inserts 75a may be readily replaced as their guide surfaces become worn.

The bearing caps 47 and 71a are provided with tail pieces 110 and 111, respectively, which extend longitudinally of the machine towards the left end thereof as seen in Fig. 1, and are adapted to be releasably secured together at their outer ends by means of a bolt 112. The tail pieces 110 and 111 are of a length sufficient to accommodate the greatest width of band saw or other work material to be operated upon by the machine, and when locked together maintain the rollers 48 and 73 in a desired position of adjustment with respect to each other. The construction of the locking means is such as to permit the roller 73 to be adjusted vertically and to permit the rollers 48 and 73 to be adjusted axially with respect to each other, and the locking means is readily released by unscrewing bolt 112 to permit the supplemental support to be swung upwardly about the pivot 58.

After the tail pieces 110 and 111 are secured together the rollers 48 and 73 are adapted to be moved as a unit longitudinally of the bed 36 and the supplemental support to operate upon a desired portion of a band saw or other work 113 introduced between the rollers for reforming, stretching, straightening or shearing. This adjustment is provided by a hand wheel 114 mounted on one end of a transverse horizontal shaft 115 which is rotatably mounted in a bracket 116 secured to the bed 36 by screws 117. A bevel gear 118 is fastened to the other end of shaft 115 and engages a bevel gear 119 fastened to one end of a vertical shaft 120 which is rotatably mounted in a bearing 121 provided in a bracket 122 secured by screws 123 to the under side of bed 36. A pinion 124 is fastened to the other end of shaft 120 and meshes with a rack 125 which is secured to the underside of block 43 by means of bolts 126a and is guided by a finished surface 126 on one end of the gibs 41. Thus, upon turning wheel 114 to cause rotation of shafts 115 and 120, the position of blocks 43 and 72 and their associated parts is simultaneously shifted longitudinally in relation to bed 36. The desired longitudinal position of the rollers 49 and 73 will depend on the width of the band saw or other work and the location of a given deformation therein, one edge of the work 113 being guided by hardened steel plates 127 mounted in brackets 128 which are adjustably secured in slots 129 provided in bed 36 by means of T bolts 130 having hand wheel nuts 131 threaded on their upper end.

In order to introduce a band saw or other continuous article to working position, the supplemental support including the supporting members 75 is swung upwardly about pivots 58, a counterweight 59a being provided to assist in moving the support. After the work is inserted so as to rest on roller 49 with one edge against guide plates 127, the supplemental support is again lowered so as to bring roller 73 in contact with the upper surface of the work. Downward movement of the members 75, block 72 and associated parts is limited by adjustable screws 132. These screws are mounted in brackets 133 integral with or secured to supporting members 75, and are arranged so that their lower end will bear against the top surface of bed 36 at 134.

A clamping yoke 135 provides for normally retaining the supplemental support in its downward operative position. This yoke is pivoted at 136 to bed 36 at its left end (Fig. 4), and is provided with a clamping screw 137 having an operating handle 137a and adapted to engage a lug 75a integral with or secured to an end portion 75b connecting the supporting members 75. By adjustment of screw 137 and screws 132, members 75 may be tightly secured in desired position in relation to bed 36. Further adjustment of the vertical position of roller 73 in relation to the work and roller 49 to obtain a desired rolling pressure, may be made by turning handle 96 controlling shaft 85, as above indicated.

Band saws are sometimes badly distorted or twisted by striking nails, knots or other hard objects. In such cases it may be desirable to subject the work to a supplemental or auxiliary straightening operation. For this purpose an attachment as follows is provided.

A bracket 138 having an angular extension 139 is secured to the upper bearing caps 70a and 71a by means of screws 140. An arm 141 is pivotally mounted at 142 in the upper end of extension 139 and carries a pin 144 upon which a roller 143 is rotatably mounted. The extension 139 is also provided with a lug 145 adapted to receive a set screw 146 whose lower end engages the lower portion of arm 141. The arrangement is such that by adjusting set screw 146 the vertical position of arm 141 and roller 143 may be adjusted, arm 141 being normally drawn upwardly by spring 147 connecting the arm and extension 139.

A second bracket 148 is attached to the bearing caps 46 and 47 by screws 149 and is provided with an extension 150 adapted to receive pins 152 upon which spaced rollers 151 are rotatably mounted. Brackets 138 and 148, and their associated parts, are so positioned and arranged that roller 143 is located between the rollers 151 and cooperates with the rollers 151 to exert a desired straightening action on the work 113. To further support extension 150 of bracket 148, an adjustable set screw 153 having a lock nut 154 is provided on the under side of the extension 150 and is so arranged that its lower end will bear against the top surface of bed 36 during the rolling operation.

The several bearing caps 70a, 71a, 46 and 47 are preferably provided with tapped openings for the screws 140 and 149 on both sides of the caps, as indicated at 140a and 149a in Figs. 3 and 5, whereby the brackets 138 and 148 may be readily and simply attached to the machine at either side of the main rolls 48 and 73. The auxiliary straightening attachment is also readily detached from the machine when its use is not desired by merely removing the screws 140 and 149.

A simple, effective and improved machine is thus provided for straightening, stretching or otherwise operating upon band saws and other articles such, for example, as armor plate. The machine may also be used as a shearing device by proper adjustment of the rollers 48 and 73. The rollers 48 and 73 are axially adjustable with respect to each other by releasing the locking connection between the tail pieces 110 and 111 and moving the block 46 relatively to the block 72. The rollers 48 and 73 are also adjustable longitudinally of the bed plate 36 and the supplemental support properly to position the rollers with respect to a desired operation to be performed upon the work material. A hand wheel 114 in connection with the pinion 124 and the rack 125 provides for simply and conveniently effecting each of these adjustments. The vertical or radial position of the roller 73 with respect to the roller 48 is readily adjusted by means of the screw threaded shaft 85 and the operating handle 96. Further vertical adjustment may be obtained, if necessitated by the thickness of the work material, by adjustment of the adjusting screws 132 and 137. During vertical adjustment the shafts 35 and 69 are maintained in parallel relationship at all times, thereby avoiding any tilting or canting of the rollers 48 and 73. The coupling 66—67—68 permits ready adjustment of the shaft 69 while maintaining its axis parallel with the shaft 35.

The yoke 135 provides for releasably securing the supplemental support in its lowered operative position and is swingable about its pivot to permit upward movement of the supplemental support about the pivots 58, as indicated in dotted lines in Fig. 1. A band saw or other continuous article may thus be inserted between the rollers 48 and 73 and is arranged in proper position by engaging the guide plates 127. A supplemental or auxiliary straightening means is removably attached to the machine and is adapted to be attached on either side of the rolls 48 and 73. This auxiliary straightening means may operate either in conjunction with the main rolls 48 and 73, or may be a separate straightening means in which the rolls 48 and 73 operate merely as a feed for the band saw or other article. The auxiliary straightening means may be simply and readily removed from the machine when the use thereof is not desired.

When the proper adjustments have been made the shafts 35 and 69 are rotated by means of the motor 16. In the usual operation of the device only a small portion of the band saw or other article is operated upon at one time, and the motor 16 is preferably reversible in order that this portion of the work material may be run back and forth between the rolls 48 and 73, and the rolls 143 and 151 if such are used. As above described, the auxiliary rolls 143 and 151 may be readily detached from the machine if their use is not required.

Changes may be made in the form, construction and arrangement of the parts without departing from the spirit of the invention, and the right is hereby reserved to make all such changes as fairly fall within the scope of the following claims.

The invention is hereby claimed as follows:

1. A rolling and stretching machine of the character described comprising a frame, a supporting means mounted on said frame, a supplemental support pivotally mounted on said frame, a pair of spaced substantially parallel shafts rotatably carried by said supporting means and said supplemental support respectively, a pair of opposed rollers for receiving work material therebetween splined to said shafts and axially slidable thereon to adjust the position of the rollers lengthwise of the shafts and with respect to each other, means on said supplemental support for varying the distance between said shafts while maintaining the shafts parallel thereby to adjust the spacing between the peripheries of said rollers without tilting the rollers, means including a member slidably supported on said supplemental support for carrying said last named means, and roller means operable upon the supplemental support for taking a part of the load on said slidable member.

2. A rolling and stretching machine of the character described comprising a frame, a supporting means mounted on said frame, a supplemental support pivotally mounted on said frame, a pair of spaced substantially parallel shafts rotatably carried by said supporting means and said supplemental support respectively, a pair of opposed rollers for receiving work material therebetween splined to said shafts and axially slidable thereon to adjust the position of the rollers lengthwise of the shafts and with respect to each other, means on said supplemental support for varying the distance between said shafts while maintaining the shafts parallel thereby to adjust the spacing between the peripheries of said rollers without tilting the rollers, means including a member slidably supported on said supplemental support for carrying said last named means, roller means operable upon the supplemental support for taking a part of the load on said slidable member, and means for adjusting the proportion of the load taken by said roller means.

CLARK IRA PLATT.
EDDIE CHRISTIAN FILSTRUP.